US010619893B2

(12) United States Patent
Tsubouchi

(10) Patent No.: US 10,619,893 B2
(45) Date of Patent: Apr. 14, 2020

(54) ABSORPTION HEAT PUMP DEVICE

(71) Applicant: AISIN SEIKI KABUSHIKI KAISHA, Kariya-shi, Aichi-ken (JP)

(72) Inventor: Osamu Tsubouchi, Chiryu (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 138 days.

(21) Appl. No.: 15/580,822

(22) PCT Filed: Jul. 12, 2016

(86) PCT No.: PCT/JP2016/070596
§ 371 (c)(1),
(2) Date: Dec. 8, 2017

(87) PCT Pub. No.: WO2017/018208
PCT Pub. Date: Feb. 2, 2017

(65) Prior Publication Data
US 2018/0163999 A1    Jun. 14, 2018

(30) Foreign Application Priority Data

Jul. 27, 2015 (JP) ................. 2015-147593

(51) Int. Cl.
*F25B 30/04* (2006.01)
*F25B 15/14* (2006.01)
(Continued)

(52) U.S. Cl.
CPC .............. *F25B 15/14* (2013.01); *F25B 30/04* (2013.01); *F25B 33/00* (2013.01); *F25B 37/00* (2013.01);
(Continued)

(58) Field of Classification Search
CPC ........ F25B 30/04; F25B 37/00; F25B 15/004; F25B 15/06; Y02A 30/277; Y02B 30/62; F28D 21/0015
See application file for complete search history.

(56) References Cited

U.S. PATENT DOCUMENTS 9,677,791 B2 *  6/2017  Heinzl .................... F25B 15/06
2014/0290306 A1  10/2014  Heinzl
2015/0168029 A1   6/2015  Tsubouchi

FOREIGN PATENT DOCUMENTS

DE    10 2011 110 018 A1    2/2013
JP         1-98866 A         4/1989
(Continued)

OTHER PUBLICATIONS

The extended European Search Report dated Apr. 26, 2018, by the European Patent Office in corresponding European Patent Application No. 16830313.9-1008. (8 pages).
(Continued)

*Primary Examiner* — Frantz F Jules
*Assistant Examiner* — Lionel Nouketcha
(74) *Attorney, Agent, or Firm* — Buchanan Ingersoll & Rooney PC

(57) ABSTRACT

An absorption heat pump device capable of suppressing a reduction in performance as the absorption heat pump device resulting from improper control of the concentration of an absorbing liquid due to the inclination, shaking, etc. of a vehicle body at the time of mounting the absorption heat pump device on a vehicle is provided. An absorption heat pump device in which an absorbing liquid absorbs refrigerant vapor includes an evaporator that evaporates a refrigerant and an absorber in which the refrigerant vapor evaporated in the evaporator is absorbed by the absorbing liquid. The absorber includes a heat exchange section that removes absorption heat of the refrigerant vapor into the absorbing
(Continued)

liquid and a membrane member, disposed so as to surround and cover the heat exchange section that the absorbing liquid contacts, through which the refrigerant vapor can pass but the absorbing liquid cannot pass.

7 Claims, 4 Drawing Sheets

(51) Int. Cl.
　　　*F25B 37/00*　　　(2006.01)
　　　*F25B 33/00*　　　(2006.01)
　　　*F25B 15/00*　　　(2006.01)
　　　*F25B 15/06*　　　(2006.01)
　　　*F28D 21/00*　　　(2006.01)

(52) U.S. Cl.
　　　CPC ............. *F25B 15/004* (2013.01); *F25B 15/06* (2013.01); *F28D 21/0015* (2013.01); *Y02A 30/277* (2018.01); *Y02B 30/62* (2013.01)

(56) References Cited

FOREIGN PATENT DOCUMENTS

| | | |
|---|---|---|
| JP | 4-268176 A | 9/1992 |
| JP | 9-210412 A | 8/1997 |

OTHER PUBLICATIONS

International Search Report (PCT/ISA/210) dated Oct. 11, 2016, by the Japanese Patent Office as the International Searching Authority for International Application No. PCT/JP2016/070596.

Written Opinion (PCT/ISA/237) dated Oct. 11, 2016, by the Japanese Patent Office as the International Searching Authority for International Application No. PCT/JP2016/070596.

* cited by examiner

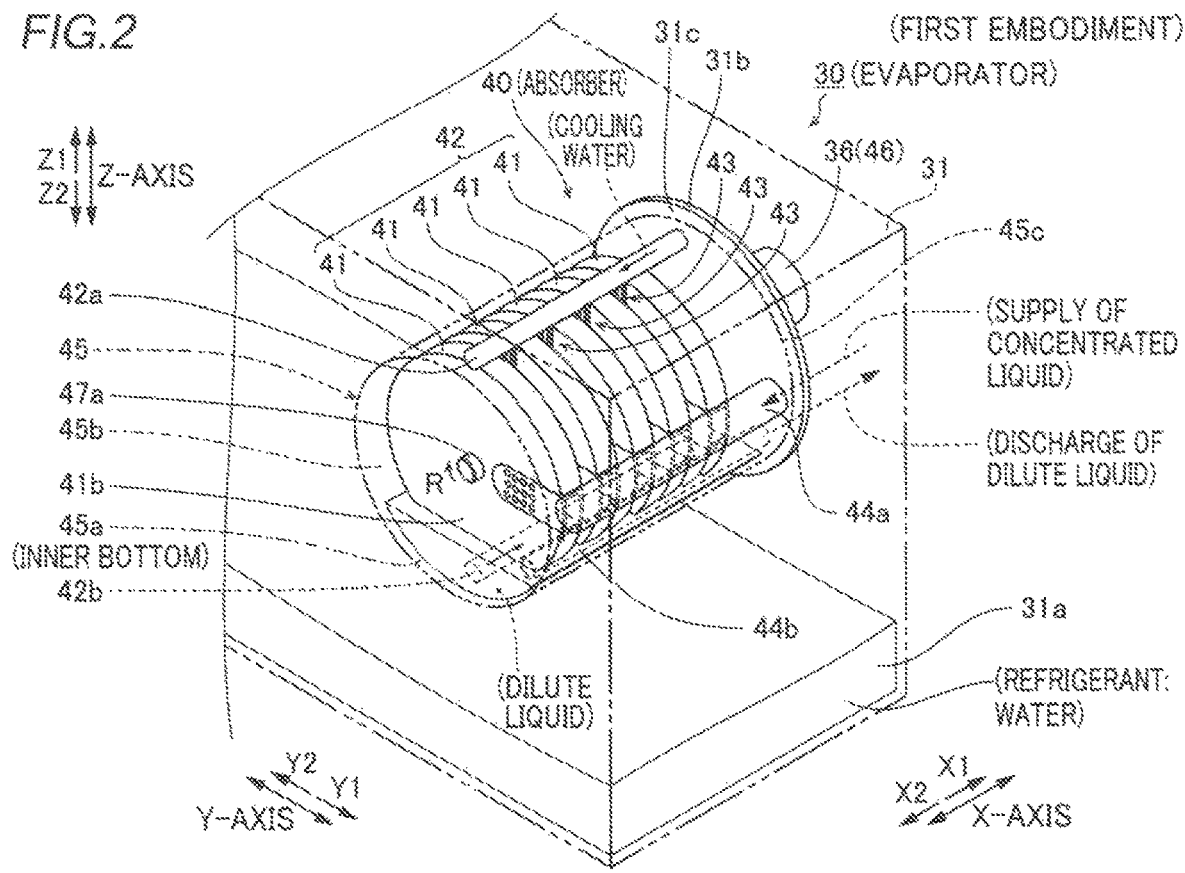
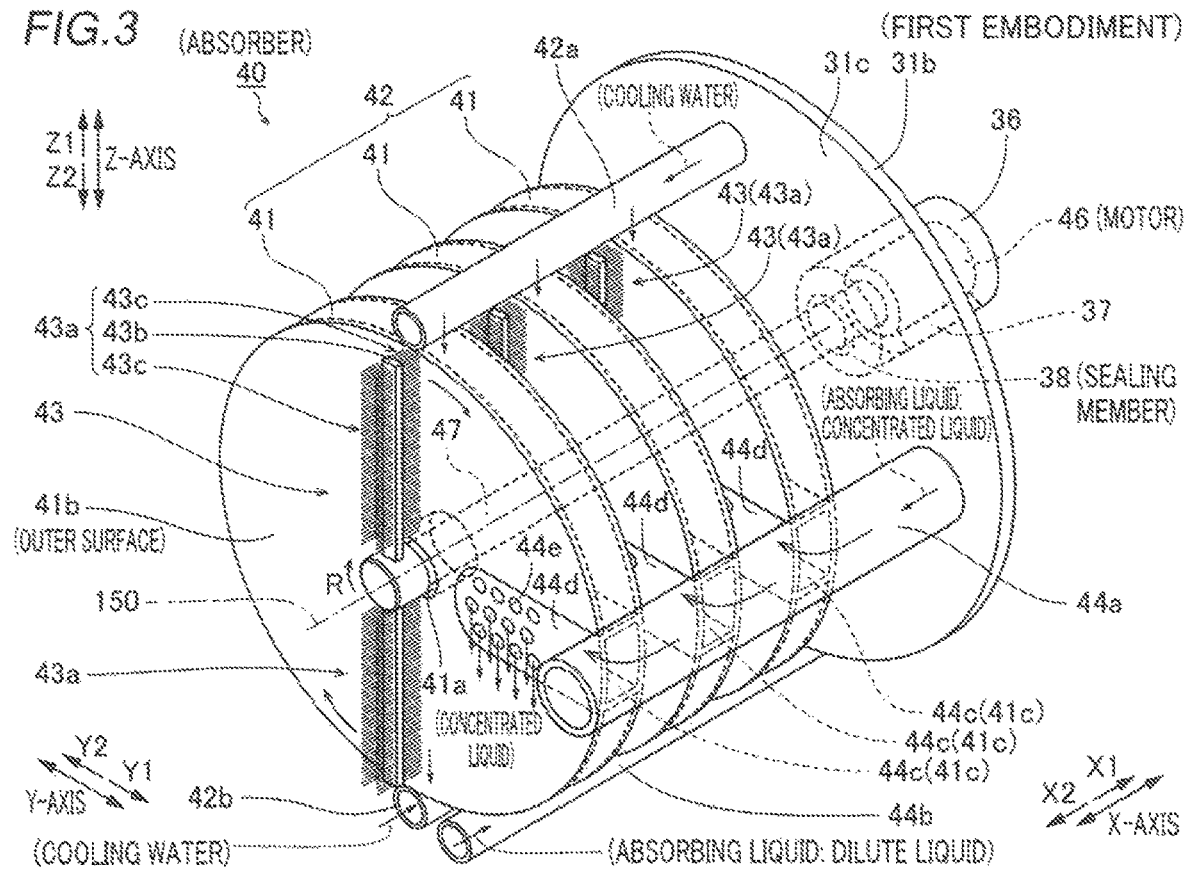

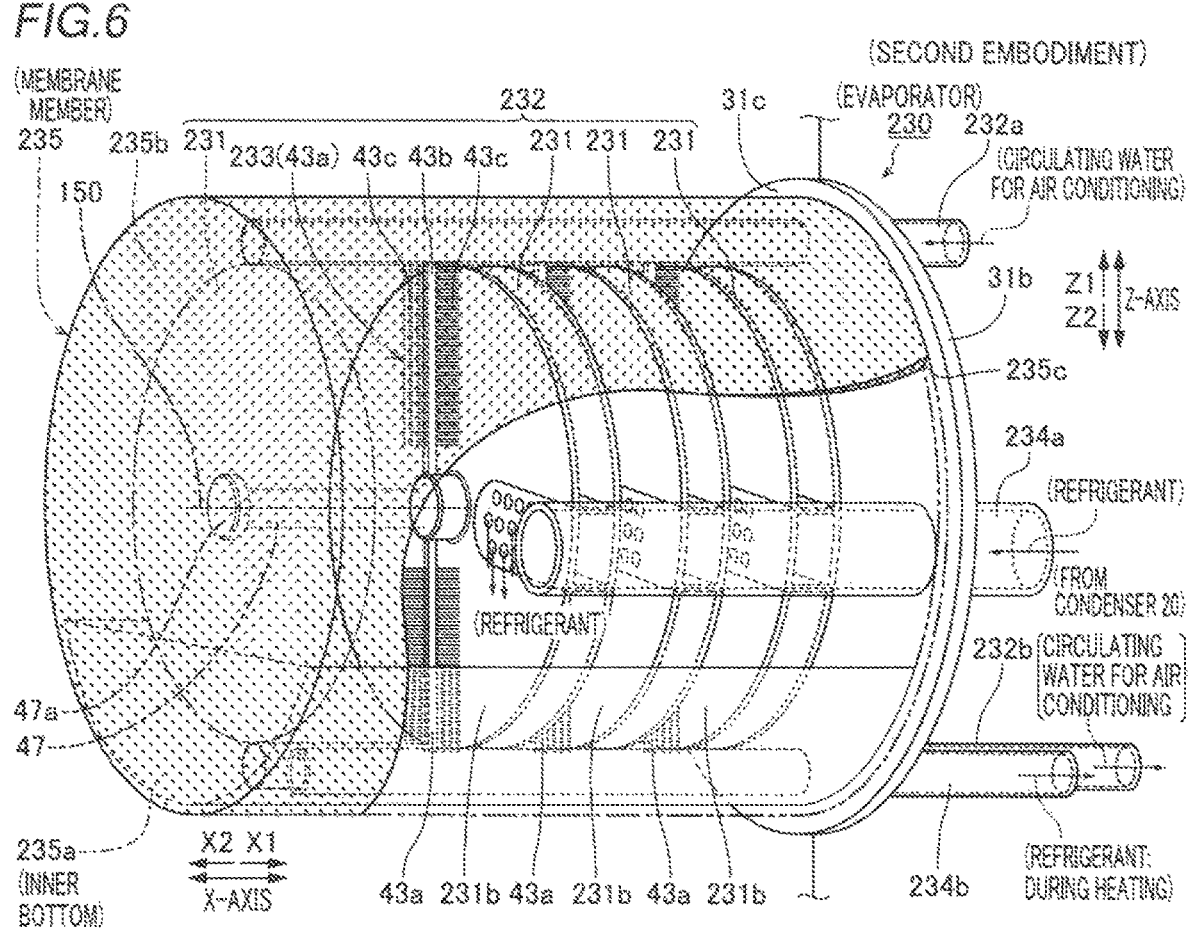

ABSORPTION HEAT PUMP DEVICE

TECHNICAL FIELD

The present invention relates to an absorption heat pump device.

BACKGROUND ART

In general, an absorption heat pump device using an absorbing liquid capable of absorbing vapor during evaporation of a refrigerant is known. Such an absorption heat pump device is disclosed in Japanese Patent Laying-Open No. 1-98866, for example.

Japanese Patent Laying-Open No. 1-98866 discloses an absorption cold and hot heat generator (absorption heat pump device) including a concentrator (generator), a condenser, an evaporator, and an absorber. In this absorption cold and hot heat generator described in Japanese Patent Laying-Open No. 1-98866, the absorber communicates with the evaporator through a vapor passage, and a module including a hydrophobic porous membrane and a heat transfer body (a heat transfer surface for heat exchange) is disposed in the absorber. Here, the hydrophobic porous membrane is made of a material through which only gas can pass but a liquid substance cannot pass, and can form a passage of a solution (absorbing liquid). Thus, in the absorber, the absorbing liquid supplied into the module from an inlet port at one end of the hydrophobic porous membrane absorbs refrigerant vapor that has passed through the hydrophobic porous membrane via the vapor passage from the evaporator, and absorption heat is transferred to a cooling water side through the heat transfer body. Then, the diluted absorbing liquid is discharged from the module through an outlet port at the other end of the hydrophobic porous membrane and is stored in the bottom of the absorber, and thereafter is discharged to the concentrator (generator).

PRIOR ART

Patent Document

Patent Document 1: Japanese Patent Laying-Open No. 1-98866

SUMMARY OF THE INVENTION

Problem to be Solved by the Invention

However, in the absorption cold and hot heat generator described in Japanese Patent Laying-Open No. 1-98866, the absorbing liquid cooled by absorbing the refrigerant vapor is discharged from the module and is stored in the bottom of the absorber, and hence when the absorption cold and hot heat generator (absorption heat pump device) is mounted on a vehicle or the like and is applied to in-vehicle air conditioning, for example, the absorbing liquid stored in the bottom of the absorber may flow back into the evaporator through the vapor passage and be mixed into the refrigerant in the evaporator due to the inclination, shaking, etc. of a vehicle body at the time of mounting the absorption cold and hot heat generator on the vehicle. Thus, it is impossible to properly perform control of the concentration of the absorbing liquid, which is central to an absorption refrigeration cycle, and there is such a problem that performance as the absorption heat pump device reduces.

The present invention has been proposed in order to solve the aforementioned problem, and an object of the present invention is to provide an absorption heat pump device capable of suppressing a reduction in the performance of an absorption refrigeration cycle even when the absorption heat pump device is mounted on a vehicle.

Means for Solving the Problem

In order to attain the aforementioned object, an absorption heat pump device according to a first aspect of the present invention is an absorption heat pump device in which an absorbing liquid absorbs refrigerant vapor, and includes an evaporator that evaporates a refrigerant and an absorber in which the refrigerant vapor evaporated in the evaporator is absorbed by the absorbing liquid. The absorber includes a heat exchange section that removes absorption heat of the refrigerant vapor into the absorbing liquid, and a membrane member, disposed so as to surround and cover the heat exchange section that the absorbing liquid contacts, through which the refrigerant vapor can pass but the absorbing liquid cannot pass.

In the absorption heat pump device according to the first aspect of the present invention, as hereinabove described, the absorber is provided with the membrane member, disposed so as to surround and cover the heat exchange section that the absorbing liquid contacts, through which the refrigerant vapor can pass but the absorbing liquid cannot pass. Thus, the membrane member surrounds and covers the heat exchange section such that the entirety of the absorber may be made up, and hence it is possible to discharge the absorbing liquid (dilute liquid) obtained by absorption of the refrigerant vapor that has passed through the membrane member into the absorbing liquid (concentrated liquid) from a portion other than the membrane member to the outside of the absorber in a state where the absorbing liquid is stored inside the membrane member. That is, it is possible to suppress passing of the absorbing liquid through the membrane member and direct backflow of the absorbing liquid to the evaporator. Therefore, even when the absorption heat pump device according to the present invention is mounted on a vehicle or the like, backflow of the absorbing liquid (dilute liquid) to the evaporator due to the inclination, shaking, etc. of a vehicle body is suppressed, and hence it is possible to suppress a reduction in the performance of an absorption refrigeration cycle even when the absorption heat pump device is mounted on the vehicle.

In the aforementioned absorption heat pump device according to the first aspect, the absorbing liquid is preferably stored in an inner bottom of the membrane member. According to this configuration, it is possible to store, in the inner bottom of the membrane member that surrounds and covers the heat exchange section, the absorbing liquid (dilute liquid) obtained by absorption of the refrigerant vapor into the absorbing liquid (concentrated liquid) in the absorber, and hence it is possible to directly discharge the stored absorbing liquid (dilute liquid) from the portion other than the membrane member to the outside of the absorber without mixing into the evaporator.

The aforementioned absorption heat pump device according to the first aspect preferably further includes a rotating application section that applies the absorbing liquid to be supplied to the absorber along an outer surface of the heat exchange section, and the refrigerant vapor that has passed through the membrane member is preferably absorbed by the absorbing liquid applied along the outer surface of the heat exchange section by the rotating application section.

According to this configuration, the refrigerant vapor that has passed through the membrane member can be efficiently absorbed by the absorbing liquid in a state where the absorbing liquid is applied onto the outer surface of the heat exchange section by the rotating application section. In addition, the absorbing liquid diluted by the refrigerant vapor absorbed on the outer surface of the heat exchange section can be scraped down by the rotating application section and be stored in the inner bottom of the membrane member. Thus, the refrigerant vapor can be continuously absorbed by the absorbing liquid (concentrated liquid) newly supplied to the outer surface of the heat exchange section while the cooled absorbing liquid (dilute liquid) is removed from this outer surface, and hence the performance of the absorber can be continuously maintained.

In the aforementioned structure in which the absorbing liquid is stored in the inner bottom of the membrane member, the heat exchange section preferably has a structure in which flat plate-shaped heat exchangers through which a heat exchange fluid flows are stacked in a transverse direction, the absorbing liquid is preferably supplied to a region inside the membrane member through an absorbing liquid supply path that extends in a direction in which the heat exchangers are stacked inside the membrane member, and the absorbing liquid that has absorbed the refrigerant vapor and has been stored in the inner bottom of the membrane member is preferably discharged outside through an absorbing liquid discharge path that extends in the direction in which the heat exchangers are stacked.

According to this configuration, the flat plate-shaped heat exchangers are stacked in the transverse direction such that the refrigerant vapor taken in through the membrane member can be efficiently guided to heat transfer surfaces of the heat exchangers, and its absorption into the absorbing liquid can be promoted. In addition, the absorbing liquid (concentrated liquid) and the absorbing liquid (dilute liquid) can be easily supplied and discharged through the absorbing liquid supply path and the absorbing liquid discharge path that extend in the stacking direction (transverse direction) of the heat exchangers, respectively. Moreover, the membrane member can easily cover, in this stacking direction, the entire heat exchange section in which the heat exchangers are stacked in the transverse direction.

In the aforementioned absorption heat pump device according to the first aspect, the heat exchange section preferably has a structure in which flat plate-shaped heat exchangers through which a heat exchange fluid flows are stacked in a transverse direction, and the heat exchange section preferably also serves as a support member that supports the membrane member that surrounds and covers the heat exchange section.

According to this configuration, even when the membrane member made of a material that is less likely to maintain its shape is used, the membrane member can be easily held around the heat exchange section by using the stiffness of the heat exchange section in which the flat plate-shaped heat exchangers are stacked. Thus, even when the absorber receives vibrations from the vehicle body side, it is possible to easily prevent the membrane member from falling off the heat exchange section.

In the aforementioned absorption heat pump device according to the first aspect, the evaporator preferably includes a refrigerant storage that stores the refrigerant before evaporation, and inside the evaporator, a vicinity of a lowermost portion of the membrane member of the absorber is preferably disposed above an upper surface of the refrigerant storage.

According to this configuration, the membrane member does not contact the refrigerant storage (liquid refrigerant), and hence the refrigerant vapor evaporated from the refrigerant storage can pass through the membrane member (taken) toward the heat exchange section (inwardly) by maximally using the surface area of the membrane member. Thus, the performance of the absorber can be highly maintained. Furthermore, the absorber is provided inside the evaporator, and hence it is possible to reduce the size of the absorption heat pump device.

In the aforementioned structure in which the absorbing liquid is stored in the inner bottom of the membrane member, the refrigerant vapor evaporated in the evaporator preferably passes through an outer surface of the membrane member other than the inner bottom in which the absorbing liquid is stored, and is preferably supplied into the absorber.

According to this configuration, it is possible to take the refrigerant vapor from the evaporator into the absorber by maximally using the outer surface of the membrane member exposed to the atmosphere filled with the refrigerant vapor.

In the aforementioned absorption heat pump device according to the first aspect, the heat exchange section of the absorber including the membrane member preferably protrudes from an inner wall surface of the evaporator, and the membrane member is preferably fixed to the inner wall surface of the evaporator from which the heat exchange section protrudes in a state where the membrane member provides a seal around the heat exchange section.

According to this configuration, the heat exchange section can have a cantilever structure with respect to the inner wall surface of the evaporator, and hence the membrane member can easily cover the entire heat exchange section. Furthermore, a cooling water supply pipe, a cooling water discharge pipe, a concentrated liquid supply pipe, and a dilute liquid discharge pipe can be intensively disposed in a portion of the inner wall surface to which a base of the heat exchange section is fixed, and hence it is possible to circumferentially bond an end of the membrane member that covers the heat exchange section to the inner wall surface of the evaporator without being affected by these pipes.

An absorption heat pump device according to a second aspect of the present invention is an absorption heat pump device in which an absorbing liquid absorbs refrigerant vapor, and includes an evaporator that evaporates a refrigerant and an absorber in which the refrigerant vapor evaporated in the evaporator is absorbed by the absorbing liquid. The absorber or the evaporator includes a heat exchange section that removes absorption heat of the refrigerant vapor into the absorbing liquid or evaporates the refrigerant and a membrane member, disposed so as to surround and cover the heat exchange section that the absorbing liquid or the refrigerant contacts, through which the refrigerant vapor can pass but the absorbing liquid or the refrigerant cannot pass.

The absorption heat pump device according to the second aspect of the present invention includes the aforementioned configuration, whereby the membrane member surrounds and covers the heat exchange section such that the entirety of the absorber may be made up, and hence it is possible to suppress passing of the absorbing liquid through the membrane member and direct backflow of the absorbing liquid to the evaporator. Furthermore, the membrane member surrounds and covers the heat exchange section such that the entirety of the evaporator may be made up, and the evaporated refrigerant vapor (low-temperature water vapor) can pass through the membrane member and be supplied to the absorber in a state where the refrigerant (liquid refrigerant) is stored inside the membrane member. Thus, it is possible to suppress mixing of the refrigerant (liquid refrigerant) of the evaporator into the absorber. Therefore, even when the absorption heat pump device according to the present invention is mounted on a vehicle or the like, backflow of the absorbing liquid (dilute liquid) of the absorber to the evaporator and mixing of the refrigerant (liquid refrigerant) of the evaporator into the absorber due to the inclination, shaking, etc. of a vehicle body are suppressed, and hence it is possible to suppress a reduction in the performance of an absorption refrigeration cycle even when the absorption heat pump device is mounted on the vehicle.

BRIEF DESCRIPTION OF THE DRAWINGS

FIG. 2 A perspective view showing an absorber installed in an evaporator according to the first embodiment of the present invention.

FIG. 3 A perspective view showing the detailed structure of the absorber according to the first embodiment of the present invention.

FIG. 6 A perspective view showing the detailed structure of the evaporator according to the second embodiment of the present invention.

MODES FOR CARRYING OUT THE INVENTION

Embodiments of the present invention are hereinafter described on the basis of the drawings.

First Embodiment

The configuration of an absorption heat pump device 100 according to a first embodiment of the present invention is now described with reference to FIGS. 1 to 4.

(Configuration of Absorption Heat Pump Device)

The absorption heat pump device 100 according to the first embodiment of the present invention uses water as a refrigerant and a lithium bromide (LiBr) aqueous solution as an absorbing liquid. Furthermore, the absorption heat pump device 100 is mounted on a vehicle (not shown) such as a passenger car or a bus including an engine 90 (internal combustion engine), and is configured to be applied to an in-vehicle air conditioning system.

Figure 1:
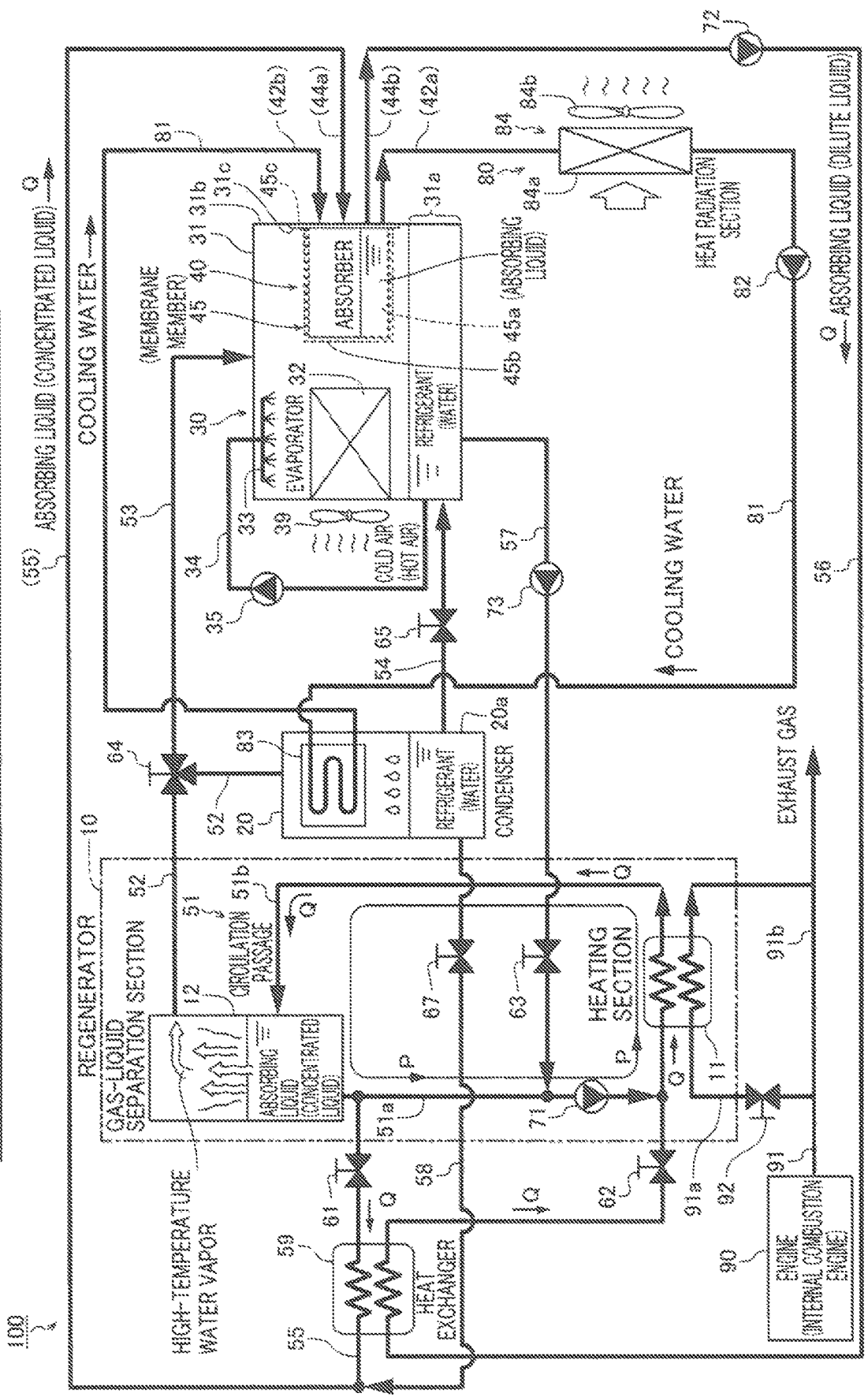
FIG. 1 A diagram showing the overall configuration of an absorption heat pump device according to a first embodiment of the present invention.

As shown in FIG. 1, the absorption heat pump device 100 includes a regenerator 10 (in a frame shown by a two-dot chain line), a condenser 20, an evaporator 30, and an absorber 40. The regenerator 10 provides for separation of refrigerant vapor (high-temperature water vapor) from the absorbing liquid. The condenser 20 provides for condensation (liquefaction) of the refrigerant vapor during a cooling operation. The evaporator 30 provides for evaporation (vaporization) of the refrigerant that has become condensed water under low-temperature and low-pressure conditions during the cooling operation. The absorber 40 provides for absorption of the refrigerant vapor (low-temperature water vapor) vaporized by the evaporator 30 into the absorbing liquid supplied in a concentrated state.

The regenerator 10 includes a heating section 11 that heats the absorbing liquid and a gas-liquid separation section 12 that separates the refrigerant vapor from the absorbing liquid heated by the heating section 11. In the heating section 11, high-temperature exhaust gas that flows through an exhaust pipe 91 routed from the engine 90 is heat-exchanged with the absorbing liquid. The exhaust pipe 91 includes an exhaust heat supply path 91a that passes through the heating section 11 and a detour path 91b that does not pass through the heating section 11, and a valve 92 is provided in the exhaust heat supply path 91a. The valve 92 is open during the cooling operation and during a heating operation such that the exhaust gas discharged from the engine 90 partially flows to the heating section 11 through the exhaust heat supply path 91a.

The absorption heat pump device 100 also includes a circulation passage 51 including absorbing liquid circulation paths 51a and 51b, refrigerant vapor passages 52 and 53, a refrigerant passage 54, absorbing liquid passages 55 and 56, and refrigerant supply paths 57 and 58. The circulation passage 51 provides for circulation of the absorbing liquid between the heating section 11 and the gas-liquid separation section 12, and a pump 71 is provided in the absorbing liquid circulation path 51a. The refrigerant vapor passage 52 provides for supply of the refrigerant vapor from the gas-liquid separation section 12 to the condenser 20 during the cooling operation. The refrigerant vapor passage 53 provides for flow of the refrigerant vapor separated by the gas-liquid separation section 12 into the evaporator 30 during the heating operation. At a connection between the refrigerant vapor passage 52 and the refrigerant vapor passage 53, a three-way valve 64 capable of switching a state where the refrigerant vapor passage 52 is open during the cooling operation and a state where the refrigerant vapor passage 53 is open during the heating operation is provided. In addition, a valve 65 is provided in the refrigerant passage 54.

The absorbing liquid passage 55 provides for supply of the absorbing liquid (concentrated liquid) to the absorber 40 according to the opening and closing operation of a valve 61. The absorbing liquid passage 56 provides for supply of the absorbing liquid (dilute liquid) stored in the absorber 40 in a state where the absorbing liquid has absorbed the refrigerant vapor to the circulation passage 51 during an interlocking operation between a pump 72 and a valve 62. The refrigerant supply path 57 provides for supply of the refrigerant (water) stored in the evaporator 30 to the circulation passage 51 due to an interlocking operation between a pump 73 and a valve 63 during the heating operation. The refrigerant supply path 58 provides for direct supply of the condensed water stored in the condenser 20 to the absorber 40 according to the opening and closing operation of a valve 67 for the purpose of preventing crystallization. In a heat exchanger 59, heat exchange between the absorbing liquid that flows through the absorbing liquid passage 55 and the absorbing liquid that flows through the absorbing liquid passage 56 is performed.

The absorption heat pump device 100 also includes a cooling water circuit 80 driven during the cooling operation. The cooling water circuit 80 is used to cool the refrigerant vapor in the condenser 20 and to remove absorption heat generated during absorption of the refrigerant into the absorbing liquid in the absorber 40. Specifically, the cooling water circuit 80 includes a cooling water circulation path 81 through which cooling water (an example of a heat exchange fluid) flows, a pump 82, a heat exchange section 83 disposed in the condenser 20, a heat exchange section 42 (see FIG. 3)

disposed in the absorber 40, and a heat radiation section 84. In the heat radiation section 84, the cooling water that flows through a heat exchange section 84a is cooled (the heat is radiated) by air (outside air) blown by a blower 84b.

As shown in FIG. 1, the evaporator 30 includes a container 31 that maintains its interior in a vacuum state of an absolute pressure of 1 kPa or less, and a heat exchange section 32 and an injector 33 both installed inside the container 31. Furthermore, outside the evaporator 30, a pump 35 is provided in a passage 34 that connects a refrigerant storage 31a to the injector 33. Thus, the refrigerant (water) in the refrigerant storage 31a is pumped by the pump 35 and is sprayed from the injector 33 to the heat exchange section 32. Therefore, during the cooling operation, suction air in the vehicle circulated by a blower 39 is cooled when passing through the heat exchange section 32 due to latent heat of evaporation obtained when the sprayed refrigerant (water) becomes refrigerant vapor (low-temperature water vapor).

According to the first embodiment, as shown in FIGS. 1 and 2, the absorber 40 is installed inside the container 31 in the evaporator 30. The structure of the absorber 40 installed in the evaporator 30 kept in a vacuum state (an absolute pressure of 1 kPa or less) is hereinafter described in detail.

(Structure of Absorber)

As shown in FIG. 3, the absorber 40 includes the heat exchange section 42 integrally including a plurality of (five) hollow disk-shaped heat exchangers 41 each having a flat longitudinal section, and rotating application sections 43 disposed between the heat exchangers 41 adjacent to each other. In the heat exchange section 42, the heat exchangers 41 are stacked at equal pitch distances in a transverse direction (X-axis direction). Furthermore, the heat exchange section 42 as a whole protrudes in the transverse direction (an arrow X2 direction in a horizontal direction) from the inner wall surface 31c of a side wall 31b of the container 31 of the evaporator 30, and is exposed to the inside of the container 31 (see FIG. 2). In the heat exchange section 42, the heat exchangers 41 are connected to each other by a cooling water supply pipe 42a and a cooling water discharge pipe 42b at the top on a Z1 side and the bottom on a Z2 side. In FIG. 3, illustration of the heat exchangers 41 and the rotating application sections 43 is partially omitted in order to show the internal structure of the absorber 40. That is, the overall structure of the absorber 40 is as shown in FIGS. 2 and 4.

As shown in FIG. 3, the heat exchangers 41 each include a pass-through 41a having a middle portion (center portion) through which a rotating shaft 47 that rotates the rotating application sections 43 passes. The pass-throughs 41a do not pass through heat transfer walls of the heat exchangers 41 from the inside to the outside, and even at the pass-throughs 41a, an internal flow path is sealed by the heat transfer walls. In addition, the cooling water supply pipe 42a and the cooling water discharge, pipe 42b pass through the inner wall surface 31c, and are connected to the external cooling water circulation path 81 (see FIG. 1). Thus, the cooling water that flows in from the cooling water supply pipe 42a is distributed to each of the heat exchangers 41 of the heat exchange section 42, flows through the heat exchangers 41 from the Z1 side to the Z2 side, converges to the cooling water discharge pipe 42b, and returns to the cooling water circulation path 81.

The heat exchange section 42 is provided with a concentrated liquid supply pipe 44a (an example of an absorbing liquid supply path) through which the absorbing liquid (concentrated liquid) is supplied and a dilute liquid discharge pipe 44b (an example of an absorbing liquid discharge path) through which the absorbing liquid (dilute liquid) is discharged in addition to the cooling water supply pipe 42a and the cooling water discharge pipe 42b. The concentrated liquid supply pipe 44a protrudes in the transverse direction (arrow X2 direction) from the inner wall surface 31c. Concentrated liquid supply ports 44c branched in an arrow Y2 direction from the concentrated liquid supply pipe 44a are inserted into corresponding U-shaped cutouts 41c of the heat exchangers 41. The heat exchangers 41 and the concentrated liquid supply ports 44c are isolated from each other by a wall on the concentrated liquid supply pipe 44a side. A plurality of holes 44e are formed in the outer surfaces 44d of the concentrated liquid supply ports 44c. Furthermore, the outer surfaces 44d are smoothly connected to the outer surfaces 41b of the heat exchangers 41. Thus, in the heat exchangers 41, the concentrated liquid flows down the outer surfaces 41b from the holes 44e of the concentrated liquid supply ports 44c. The concentrated liquid supply pipe 44a and the dilute liquid discharge pipe 44b pass through the inner wall surface 31c, and are connected to the external absorbing liquid passages 55 and 56 (see FIG. 1), respectively. Therefore, the heat exchange section 42 having a cantilever structure inwardly with respect to the inner wall surface 31c is mounted.

Figure 4:
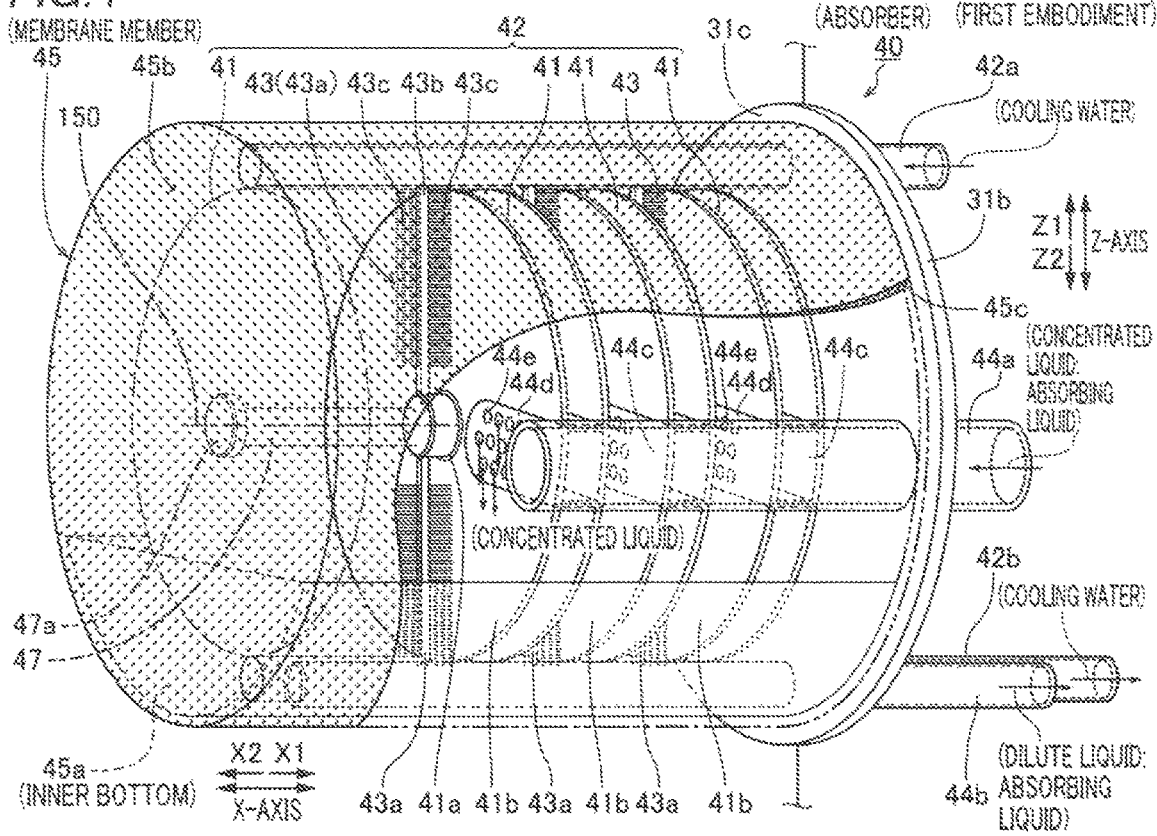
FIG. 4 A perspective view showing the overall structure of the absorber according to the first embodiment of the present invention.

According to the first embodiment, as shown in FIGS. 2 and 4, a membrane member 45 that surrounds and covers the structure in which the heat exchange section 42, the rotating application sections 43, the cooling water supply pipe 42a, the cooling water discharge pipe 42b, the concentrated liquid supply pipe 44a, and the dilute liquid discharge pipe 44b are integrated is provided to constitute the absorber 40. The membrane member 45 is made of a material through which the refrigerant vapor from the evaporator 30 can pass but the absorbing liquid in the container 31 cannot pass. The membrane member 45 includes a hydrophobic porous membrane made of a resin etc. The heat exchange section 42 has a cantilever structure, and hence the membrane member 45 covers the heat exchange section 42 in an arrow X1 direction from an end of the heat exchange section 42 on an X2 side, and a circumferential (annular) end 45c of the membrane member 45 on an X1 side is circumferentially fixed (bonded) to the inner wall surface 31c of the evaporator 30. The resin material is formed in bulk such that the end 45c of the membrane member 45 on the X1 side forms a gasket structure, and this end 45c is circumferentially welded to the inner wall surface 31c.

The entire heat exchange section 42 also serves as a support member (framework) that supports the membrane member 45. Thus, even when the membrane member 45 made of a material that is less likely to maintain its shape is used, the membrane member 45 is easily held around the heat exchange section 42 by using the stiffness of the heat exchange section 42 in which the five heat exchangers 41 are stacked and connected to each other by the cooling water supply pipe 42a and the cooling water discharge pipe 42b. Therefore, for convenience of illustration, the outer shape of the membrane member 45 is illustrated in a manner resembling a cylindrical shape, but actually, the membrane member 45 covers the structure in which the heat exchange section 42, the rotating application sections 43, the cooling water supply pipe 42a, the cooling water discharge pipe 42b, the concentrated liquid supply pipe 44a, and the dilute liquid discharge pipe 44b are integrated in a state where the membrane member 45 comes into close contact with the outer surface of the structure, and the end 45c is circumferentially welded to the inner wall surface 31c.

As shown in FIG. 4, the absorbing liquid (a mixture of the concentrated liquid and the dilute liquid) is stored in the inner bottom 45a of the membrane member 45. In this case, the refrigerant vapor evaporated in the evaporator 30 inwardly passes through the outer surface 45b of the membrane member 45 other than the inner bottom 45a in which the absorbing liquid is stored, and is supplied to the absorber 40. Thus, the membrane member 45 surrounds and covers the heat exchange section 42 to constitute the entire absorber 40, and hence after the refrigerant vapor passes through the outer surface 45b and is absorbed into the concentrated liquid on the outer surfaces 41b of the heat exchangers 41, the dilute liquid is stored in the inner bottom 45a inside the membrane member 45. Then, the dilute liquid stored in the inner bottom 45a is discharged directly to the outside of the absorber 40 (absorbing liquid passage 56 (see FIG. 1)) through the dilute liquid discharge pipe 44b.

The concentrated liquid supply pipe 44a and the dilute liquid discharge pipe 44b are disposed in the stacking direction (transverse direction) of the heat exchangers 41, and hence a supply port (the absorbing liquid passage 55 and the connection) and a discharge port (the absorbing liquid passage 56 and the connection) of the absorbing liquid to the heat exchange section 42 covered with the membrane member 45 are aggregated on one side (the X1 side of the side wall 31b) in the transverse direction. Thus, there is no connection between other than the supply port and the discharge port of the absorbing liquid and the outside of the container 31 in the heat exchange section 42, and hence the membrane member 45 can easily cover the heat exchange section 42 from the X2 side in the container 31. In addition, a sealed portion (end 45c) of the membrane member 45 to the inner wall surface 31c is limited to one region, and hence the sealability between the inside and the outside of the absorber 40 is improved, and the absorbing liquid is reliably stored inside the absorber 40 (the inner bottom 45a of the membrane member 45).

The rotating application sections 43 provide for application of the absorbing liquid (concentrated liquid) supplied to the absorber 40 along the outer surfaces 41b of the heat exchange section 42. Specifically, as shown in FIG. 3, the absorber 40 includes a motor 46 (shown by a broken line) that rotates the rotating application sections 43 in an arrow R direction about a rotation axis 150. The rotating shaft 47 (shown by a broken line) is connected to the motor 46, and extends from the X1 side to the X2 side through the pass-through 41a of each of the heat exchangers 41. The rotating application sections 43 each include a pair of brush members 43a around the rotating shaft 47, and the pair of brush members 43a are attached to the rotating shaft 47 at an interval of 180° from each other. The brush members 43a include arms 43b that extend radially outward from the rotating shaft 47 and a plurality of brushes 43c attached to the arms 43b so as to extend in a direction X1 and a direction X2 toward the outer surfaces 41b of the heat exchangers 41.

Therefore, during the cooling operation, in a state where the absorbing liquid (concentrated liquid) supplied from the gas-liquid separation section 12 (see FIG. 1) is supplied to the outer surfaces 41b of the heat exchangers 41, the brush members 43a each are rotationally moved in the arrow R direction along the outer surfaces 41b with driving of the motor 46. Thus, the refrigerant vapor that has passed through the membrane member 45 is easily absorbed into the concentrated liquid applied along the outer surfaces 41b by the rotating application sections 43. Specifically, when the brush members 43a are rotationally moved in the arrow R direction along the outer surfaces 41b, the concentrated liquid (the absorbing liquid that has absorbed a small amount of refrigerant) supplied to the brush members 43a is newly supplied to the outer surfaces 41b from which the heat-exchanged dilute liquid has been removed while the absorbing liquid (the dilute liquid diluted by absorption of the refrigerant) that has been heat-exchanged with the cooling water remaining on the outer surfaces 41b is removed from the outer surfaces 41b.

The absorption heat generated when the refrigerant vapor is absorbed by the applied absorbing liquid is deprived by the cooling water through the heat exchangers 41. Therefore, the temperature of the applied absorbing liquid is kept low, and hence further absorption of the refrigerant vapor into the applied absorbing liquid is promoted. The absorbing liquid becomes a dilute liquid, is removed from the outer surfaces 41b by the brush members 43a, and falls onto the inner bottom 45a of the membrane member 45.

According to the first embodiment, inside the container 31 (evaporator 30), the vicinity (Z2 side) of a lowermost portion of the membrane member 45 of the absorber 40 is disposed above the upper surface (water surface) of the refrigerant storage 31a, as shown in FIG. 2. Thus, the membrane member 45 does not contact the refrigerant of the refrigerant storage 31a, and hence the refrigerant vapor evaporated from the refrigerant storage 31a can pass through the membrane member 45 into the absorber 40 by maximally using the surface area of the membrane member 45.

As shown in FIG. 3, a housing 36 is attached to the outer surface of the side wall 31b of the container 31 on the X1 side. The motor 46 is fixed in the housing 36 through a fixing member 37 (shown by a broken line). The rotating shaft 47 connected to the motor 46 extends through the side wall 31b of the container 31 in the arrow X2 direction (horizontal direction) and is rotatably inserted through the pass-throughs 41a of the heat exchangers 41. An end 47a of the rotating shaft 47 is rotatably supported by a pass-through 41a of a heat exchanger 41 closest to the X2 side. A sealing member 38 is slidably fitted to the rotating shaft 47 in a portion where the rotating shaft 47 passes through the side wall 31b. The interior of the housing 36 is also kept in a vacuum state, and airtightness to the outside is maintained. With the above configuration, the absorption heat pump device 100 operates as described below.

(Operation During Cooling Operation)

During the cooling operation, as shown in FIG. 1, the pump 71 is started with the valves 61 and 62 closed, and the absorbing liquid circulates through the circulation passage 51 in an arrow P direction. When the refrigerant vapor, the temperature of which is raised by the heating section 11, separated by the gas-liquid separation section 12 reaches a predetermined temperature, the valves 61 and 62 are opened, and the pump 72 is started. Thus, the LiBr concentrated liquid stored in the gas-liquid separation section 12 flows also through the absorbing liquid passages 55 and 56 in an arrow Q direction such that a cooling cycle is formed. Furthermore, the three-way valve 64 is switched to a side on which the gas-liquid separation section 12 and the condenser 20 communicate with each other (the refrigerant vapor flows through the refrigerant vapor passage 52), and the refrigerant vapor condensed in the condenser 20 flows into the evaporator 30, and the air inside the vehicle is cooled through the heat exchange section 32.

Then, the refrigerant vapor evaporated in the heat exchange section 32 in the container 31 is suctioned into the absorber 40 through the membrane member 45. In the absorber 40, the refrigerant vapor is absorbed by the absorbing liquid (concentrated liquid) supplied to the outer surfaces 41b of the heat exchangers 41 such that the absorbing liquid becomes a dilute liquid, and is stored in the inner bottom 45a of the membrane member 45. The dilute liquid stored in the inner bottom 45a flows through the dilute liquid discharge pipe 44b and the absorbing liquid passage 55, and returns to the circulation passage 51.

(Operation During Heating Operation)

During the heating operation, the valves 61 and 62 are always closed, and the absorber 40 is not used. The three-way valve 64 is switched to a side on which the gas-liquid separation section 12 and the evaporator 30 communicate with each other (the high-temperature water vapor flows through the refrigerant vapor passage 53), the valve 65 is closed, and the condenser 20 is disconnected from the cycle. Then, immediately after the start of operation, the absorbing liquid circulates through the circulation passage 51, the temperature of the absorbing liquid is raised, and the high-temperature water vapor separated by the gas-liquid separation section 12 flows directly into the evaporator 30 (that serves as a condenser). Thus, the air inside the vehicle is warmed through the heat exchange section 32. The condensed water heat-exchanged (cooled) in the evaporator 30 returns to the circulation passage 51 through the refrigerant supply path 57 due to the interlocking operation between the pump 73 and the valve 63 such that a heating cycle is formed.

(Effects of First Embodiment)

According to the first embodiment, the following effects can be obtained.

According to the first embodiment, the absorber 40 is provided with the membrane member 45, disposed so as to surround and cover the heat exchange section 42 that the absorbing liquid contacts, through which the refrigerant vapor can pass but the absorbing liquid cannot pass. Thus, the membrane member 45 surrounds and covers the heat exchange section 42 such that the entirety of the absorber 40 may be made up, and hence it is possible to discharge the absorbing liquid (dilute liquid) obtained by absorption of the refrigerant vapor that has passed through the membrane member 45 into the absorbing liquid (concentrated liquid) from a portion other than the membrane member 45 to the outside of the absorber 40 in a state where the absorbing liquid is stored inside the membrane member 45. That is, it is possible to suppress passing of the absorbing liquid through the membrane member and direct backflow of the absorbing liquid to the evaporator 30. Therefore, even when the absorption heat pump device 100 is mounted on the vehicle or the like, backflow of the absorbing liquid (dilute liquid) to the evaporator 30 due to the inclination, shaking, etc. of a vehicle body at the time of mounting the absorption heat pump device 100 on the vehicle is suppressed, and hence it is possible to suppress a reduction in the performance of an absorption refrigeration cycle even when the absorption heat pump device 100 is mounted on the vehicle.

According to the first embodiment, the absorbing liquid is stored in the inner bottom 45a of the membrane member 45. Thus, it is possible to store, in the inner bottom 45a of the membrane member 45 that surrounds and covers the heat exchange section 42, the absorbing liquid (dilute liquid) obtained by absorption of the refrigerant vapor into the absorbing liquid (concentrated liquid) in the absorber 40, and hence it is possible to directly discharge the stored absorbing liquid (dilute liquid) from the portion other than the membrane member 45 to the absorbing liquid passage 56 outside the absorber 40 without mixing into the evaporator 30.

According to the first embodiment, the refrigerant vapor that has passed through the membrane member 45 is absorbed by the absorbing liquid applied along the outer surfaces 41b by the rotating application sections 43 that apply the absorbing liquid to be supplied to the absorber 40 along the outer surfaces 41b of the heat exchangers 41. Thus, the refrigerant vapor that has passed through the membrane member 45 can be efficiently absorbed by the absorbing liquid in a state where the absorbing liquid (concentrated liquid) is applied onto the outer surfaces 41b of the heat exchangers 41 by the rotating application sections 43. In addition, the absorbing liquid diluted by the refrigerant vapor absorbed on the outer surfaces 41b of the heat exchangers 41 can be scraped down by the rotating application sections 43 and be stored in the inner bottom 45a of the membrane member 45. Thus, the refrigerant vapor can be continuously absorbed by the absorbing liquid (concentrated liquid) newly supplied to the outer surfaces 41b of the heat exchangers 41 while the cooled absorbing liquid (dilute liquid) is removed from these outer surfaces 41b, and hence the performance of the absorber 40 can be continuously maintained.

According to the first embodiment, the heat exchange section 42 has a structure in which the five flat plate-shaped heat exchangers 41 through which cooling water flows are stacked in the transverse direction (X-axis direction), and the absorbing liquid (concentrated liquid) is supplied to a region inside the membrane member 45 through the concentrated liquid supply pipe 44a that extends in the direction in which the heat exchangers 41 are stacked inside the membrane member 45. Furthermore, the absorbing liquid that has absorbed the refrigerant vapor and has been stored in the inner bottom 45a of the membrane member 45 is discharged outside through the dilute liquid discharge pipe 44b that extends in the direction in which the heat exchangers 41 are stacked. Thus, the five heat exchangers 41 are stacked in the transverse direction (X-axis direction) such that the refrigerant vapor taken in through the membrane member 45 can be efficiently guided to the outside surfaces 41b (heat transfer surfaces) of the heat exchangers 41, and its absorption into the absorbing liquid can be promoted. In addition, the absorbing liquid (concentrated liquid) and the absorbing liquid (dilute liquid) can be easily supplied and discharged through the concentrated liquid supply pipe 44a and the dilute liquid discharge pipe 44b that extend in the stacking direction of the heat exchangers 41, respectively. Moreover, the membrane member 45 can easily cover, in this stacking direction, the entire heat exchange section 42 in which the heat exchangers 41 are stacked in the transverse direction.

According to the first embodiment, the heat exchange section 42 in which the heat exchangers 41 are stacked in the X-axis direction also serves as a support member that supports the membrane member 45 that covers the heat exchange section 42. Thus, even when the membrane member 45 made of a material that is less likely to maintain its shape is used, the membrane member 45 can be easily held around the heat exchange section 42 by using the stiffness of the heat exchange section 42 in which the flat plate-shaped heat exchangers 41 are stacked. Thus, even when the absorber 40 receives vibrations from the vehicle body side, it is possible to easily prevent the membrane member 45 from falling off the heat exchange section 42.

According to the first embodiment, inside the evaporator 30, the vicinity of the lowermost portion of the membrane member 45 of the absorber 40 is disposed above the upper surface of the refrigerant storage 31a. Thus, the membrane member 45 does not contact the refrigerant storage 31a (liquid refrigerant), and hence the refrigerant vapor evaporated from the refrigerant storage 31*a* can pass through the membrane member 45 (taken) toward the heat exchange section 42 (inwardly) by maximally using the surface area of the membrane member 45. Thus, the performance of the absorber 40 can be highly maintained. Furthermore, the absorber 40 is provided inside the evaporator 30, and hence it is possible to reduce the size of the absorption heat pump device 100.

According to the first embodiment, the refrigerant vapor evaporated in the evaporator 30 passes through the outer surface 45*b* of the membrane member 45 other than the inner bottom 45*a* in which the absorbing liquid is stored, and is supplied into the absorber 40. Thus, it is possible to take the refrigerant vapor from the evaporator 30 into the absorber 40 by maximally using the outer surface 45*b* of the membrane member 45 exposed to the atmosphere filled with the refrigerant vapor.

According to the first embodiment, the heat exchange section 42 of the absorber 40 protrudes from the inner wall surface 31*c* of the evaporator 30, and the membrane member 45 of the absorber 40 is fixed to the inner wall surface 31*c* of the evaporator 30 from which the heat exchange section 42 protrudes in a state where the membrane member 45 provides a seal around the heat exchange section 42. Thus, the heat exchange section 42 can have a cantilever structure with respect to the inner wall surface 31*c* of the evaporator 30, and hence the membrane member 45 can easily cover the entire heat exchange section 42. Furthermore, the cooling water supply pipe 42*a*, the cooling water discharge pipe 42*b*, the concentrated liquid supply pipe 44*a*, and the dilute liquid discharge pipe 44*b* can be intensively disposed in a portion of the inner wall surface 31*c* to which a base of the heat exchange section 42 is fixed, and hence it is possible to circumferentially bond the end of the membrane member 45 that covers the heat exchange section 42 to the inner wall surface 31*c* of the evaporator 30 without being affected by these pipes.

Second Embodiment

A second embodiment is now described with reference to FIGS. 1 and 4 to 6. In this second embodiment, an example in which an absorption heat pump device 200 is configured by applying the same configuration as that of an absorber 40 to an evaporator 230 in addition to the absorber 40 unlike in the aforementioned first embodiment is described.

Figure 5:
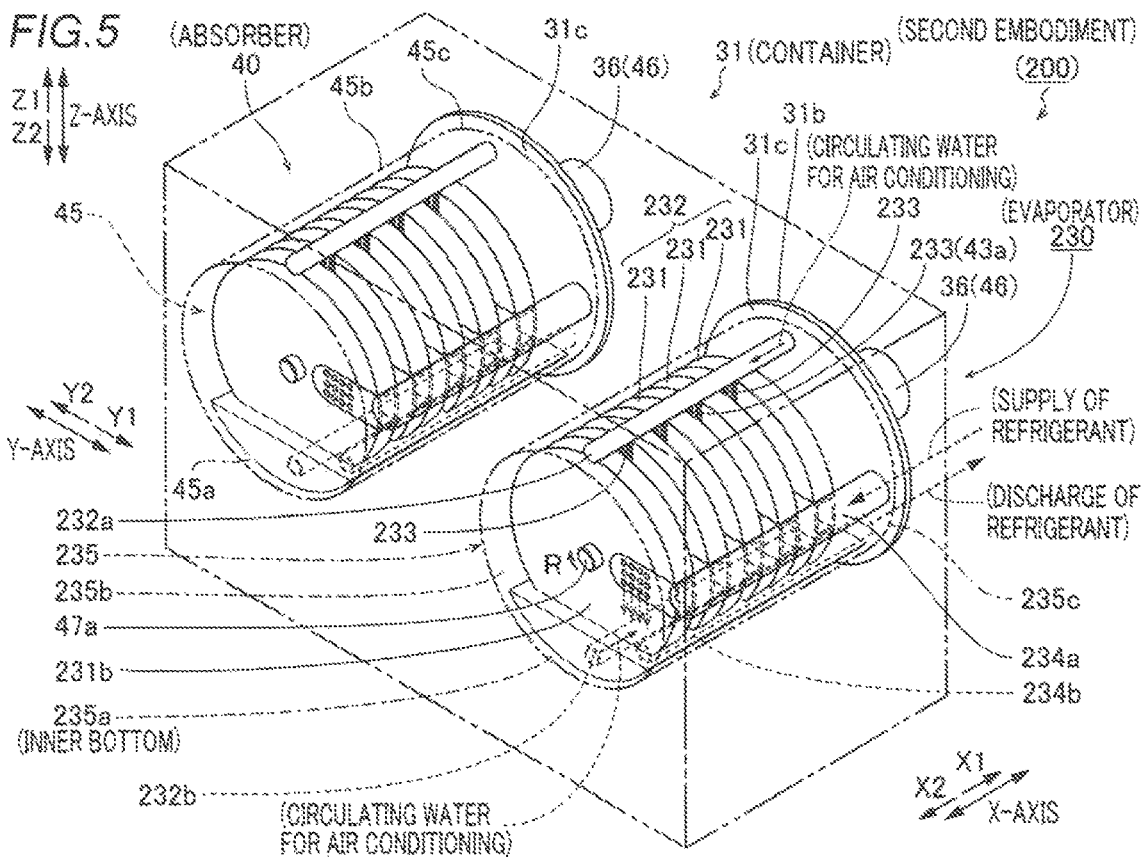
FIG. 5 A perspective view showing the overall structure of an evaporator according to a second embodiment of the present invention.

In the absorption heat pump device 200 according to the second embodiment of the present invention, the evaporator 230 and the absorber 40 are installed inside a container 31, as shown in FIG. 5. The absorber 40 is the same as that of the first embodiment, and hence description thereof is omitted. On the other hand, instead of the evaporator 30 (see FIG. 1) of the aforementioned first embodiment, the evaporator 230 having the same structure as that of the absorber 40 is provided. The structure of the evaporator 230 is described below with different reference numerals from those of the absorber 40.

(Structure of Evaporator)

As shown in FIG. 5, the evaporator 230 includes a heat exchange section 232 including five heat exchangers 231, and rotating application sections 233 disposed between the heat exchangers 231. The heat exchange section 232 protrudes in an arrow X2 direction from the inner wall surface 31*c* of the container 31. In the heat exchange section 232, the heat exchangers 231 are connected to each other by water pipes 232*a* and 232*b* for air conditioning in its upper portion and its lower portion. The water pipes 232*a* and 232*b* for air conditioning are connected to a heat exchanger (not shown). In this heat exchanger, air (outside air) blown by a blower is cooled by circulating water for air conditioning that flows through the heat exchanger (air heat exchanger). Then, the cooled air (cold air) is blown out into a vehicle. In addition to the water pipes 232*a* and 232*b*, a refrigerant supply pipe 234*a* through which a refrigerant (condensed water) is supplied and a refrigerant discharge pipe 234*b* through which the refrigerant is discharged (returns to a circulation passage 51 during a heating operation) are provided in the heat exchange section 232. The refrigerant supply pipe 234*a* and the refrigerant discharge pipe 234*b* pass through the inner wall surface 31*c*, and are connected to external refrigerant passages 54 and 57 (see FIG. 1).

According to the second embodiment, as shown in FIGS. 5 and 6, the evaporator 230 includes a membrane member 235 that surrounds and covers a structure in which the heat exchange section 232, the rotating application sections 233, the water pipes 232*a* and 232*b*, the refrigerant supply pipe 234*a*, and the refrigerant discharge pipe 234*b* are integrated. The membrane member 235 includes a hydrophobic porous membrane made of a resin etc., and the resin material is formed in bulk such that an end 235*c* thereof on an X1 side forms a gasket structure. This end 235*c* is circumferentially welded to the inner wall surface 31*c*.

Thus, during a cooling operation, the refrigerant (condensed water) condensed in a condenser 20 flows through the refrigerant passage 54 and the refrigerant supply pipe 234*a*, and is supplied to the outer surfaces 231*b* of the heat exchangers 231. Then, the refrigerant is thinly applied to the outer surfaces 231*b* with the rotation of the rotating application sections 233 (brush members 43*a*). At this time, the interior of the container 31 is in a vacuum state, and hence the refrigerant evaporates while depriving heat (latent heat of evaporation) from the circulating water for air conditioning in the heat exchangers 231. The evaporated refrigerant vapor (low-temperature water vapor) outwardly passes through the outer surfaces 235*b* of the membrane member 235 other than an inner bottom 235*a*, and is discharged to a space outside the evaporator 230 in the container 31. That is, in the evaporator 230, a refrigerant injector, a refrigerant passage that connects a refrigerant storage to the injector, a pump, etc. are not provided.

Thereafter, the refrigerant vapor (low-temperature water vapor) discharged to the space outside the membrane member 235 immediately inwardly passes through a membrane member 45 of the absorber 40 adjacent to the evaporator 230, and is supplied to the absorber 40. In addition, the refrigerant vapor is cooled and diluted in a heat exchange section 42, and is stored in an inner bottom 45*a*. In this manner, a cooling cycle is formed. The remaining configurations of the absorption heat pump device 200 according to the second embodiment are similar to those of the aforementioned first embodiment.

(Effects of Second Embodiment)

According to the second embodiment, in addition to the absorber 40, the evaporator 230 is provided with the membrane member 235, disposed so as to surround and cover the heat exchange section 232 that the refrigerant (water) contacts, through which the refrigerant vapor can pass but the refrigerant (water) cannot pass. Thus, the membrane member 235 surrounds and covers the heat exchange section 232 such that the entirety of the evaporator 230 may be made up, and the evaporated refrigerant vapor (low-temperature water vapor) can outwardly pass through the membrane member 235 and be supplied to the absorber 40 in a state where the refrigerant (water) is stored inside the membrane member 235. Thus, it is possible to suppress mixing of the refrigerant (water) of the evaporator 230 into the absorber 40. Therefore, even when the absorption heat pump device 200 is mounted on the vehicle or the like, mixing of the refrigerant (water) into the absorber 40 due to the inclination, shaking, etc. of a vehicle body at the time of mounting the absorption heat pump device 200 on the vehicle is suppressed, and hence it is possible to suppress a reduction in the performance of an absorption refrigeration cycle even when the absorption heat pump device 200 is mounted on the vehicle. The remaining effects of the second embodiment are similar to those of the aforementioned first embodiment.

Modifications

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the heat exchange section 42 (232) is constituted by the hollow disk-shaped heat exchangers 41 (231) in each of the aforementioned first and second embodiments, the present invention is not restricted to this. A plurality of heat transfer pipes may be arranged to constitute the heat exchange section. Furthermore, the number of heat exchangers 41 may be other than five.

While circulating water for air conditioning flows through the heat exchangers 231 of the evaporator 230 in the aforementioned second embodiment, the present invention is not restricted to this. For example, similarly to the usage of the evaporator 30 according to the aforementioned first embodiment, air for air conditioning may directly flow through the heat exchange section 232 such that the refrigerant (water) may be heat-exchanged with the air for air conditioning in the evaporator 230.

While the absorption heat pump device according to the present invention is applied to the air conditioning system of the vehicle such as a passenger car, a bus, or a truck in each of the aforementioned first and second embodiments, the present invention is not restricted to this. For example, the absorption heat pump device may be applied to air conditioning systems of trains, ships, etc. including a diesel engine. Furthermore, the present invention is widely applicable not only to vehicles (movable bodies) but also to stationary absorption heat pump devices for performing air conditioning of buildings, factories, commercial facilities, etc.

While the absorbing liquid is heated by the heat of the exhaust gas of the engine 90 in each of the aforementioned first and second embodiments, the present invention is not restricted to this. For example, the absorption heat pump device according to the present invention may be applied for air conditioning of hybrid cars and electric vehicles that run by driving an electric motor. Furthermore, the absorption heat pump device according to the present invention may be applied to air conditioning of passenger cars including a fuel cell system by using exhaust heat of batteries or motors of electric vehicles, exhaust heat at the time of power generation in fuel cells, etc. as a heat source for heating the absorbing liquid, for example.

While water and a lithium bromide aqueous solution are used as the refrigerant and the absorbing liquid in each of the aforementioned first and second embodiments, the present invention is not restricted to this. For example, in the absorption heat pump device, ammonia and water may be used as the refrigerant and the absorbing liquid, respectively.

DESCRIPTION OF REFERENCE NUMERALS

30, 230: evaporator
31: container
40: absorber
41, 231: heat exchanger
42, 232: heat exchange section (support member)
43, 233: rotating application section
44a: concentrated liquid supply pipe (absorbing liquid supply path)
44b: dilute liquid discharge pipe (absorbing liquid discharge path)
45, 235: membrane member
45a, 235a: inner bottom
100, 200: absorption heat pump device

The invention claimed is:

1. An absorption heat pump device in which an absorbing liquid absorbs a refrigerant vapor, comprising:
   an evaporator that evaporates a refrigerant; and
   an absorber in which the refrigerant vapor evaporated in the evaporator is absorbed by the absorbing liquid, wherein
   the absorber includes:
   a heat exchange section that removes absorption heat of the refrigerant vapor into the absorbing liquid, and
   a membrane member through which the refrigerant vapor can pass but the absorbing liquid cannot pass, said membrane member surrounding and covering the heat exchange section that the absorbing liquid contacts, wherein
   the heat exchange section of the absorber including the membrane member protrudes from an inner wall surface of the evaporator, and
   the membrane member is fixed to the inner wall surface of the evaporator from which the heat exchange section protrudes in a state where the membrane member provides a seal around the heat exchange section.

2. The absorption heat pump device according to claim 1, wherein the absorbing liquid is stored in an inner bottom of the membrane member.

3. The absorption heat pump device according to claim 2, wherein
   the heat exchange section has a structure in which flat plate-shaped heat exchangers through which a heat exchange fluid flows are stacked in a transverse direction, and
   the absorbing liquid is supplied to a region inside the membrane member through an absorbing liquid supply path that extends in a direction in which the heat exchangers are stacked inside the membrane member, and the absorbing liquid that has absorbed the refrigerant vapor and has been stored in the inner bottom of the membrane member is discharged outside through an absorbing liquid discharge path that extends in the direction in which the heat exchangers are stacked.

4. The absorption heat pump device according to claim 2, wherein the refrigerant vapor evaporated in the evaporator 1) passes through an outer surface of the membrane member other than the inner bottom in which the absorbing liquid is stored and 2) is supplied into the absorber.

5. The absorption heat pump device according to claim 1, further comprising a rotating application section that applies the absorbing liquid to be supplied to the absorber along an outer surface of the heat exchange section, wherein the refrigerant vapor that has passed through the membrane member is absorbed by the absorbing liquid applied along the outer surface of the heat exchange section by the rotating application section.

6. The absorption heat pump device according to claim 1, wherein the heat exchange section has a structure in which flat plate-shaped heat exchangers through which a heat exchange fluid flows are stacked in a transverse direction, and the heat exchange section also serves as a support member that supports the membrane member that surrounds and covers the heat exchange section.

7. The absorption heat pump device according to claim 1, wherein the evaporator includes a portion configured to store accumulated refrigerant before evaporation, and inside the evaporator, a vicinity of a lowermost portion of the membrane member of the absorber is disposed above an upper surface of the portion of the evaporator configured to store accumulated refrigerant before evaporation.

* * * * *